United States Patent
Ivinson et al.

(10) Patent No.: US 8,832,919 B2
(45) Date of Patent: Sep. 16, 2014

(54) FLANGED RIBBED NUT

(75) Inventors: Dave Ivinson, Camarillo, CA (US); John Nino, Simi Valley, CA (US)

(73) Assignee: ECA Medical Instruments, Newbury Park, CA (US)

( * ) Notice: Subject to any disclaimer, the term of this patent is extended or adjusted under 35 U.S.C. 154(b) by 176 days.

(21) Appl. No.: 13/095,767

(22) Filed: Apr. 27, 2011

(65) Prior Publication Data

US 2012/0243960 A1    Sep. 27, 2012

Related U.S. Application Data

(60) Provisional application No. 61/454,820, filed on Mar. 21, 2011.

(51) Int. Cl.
    B21D 39/00    (2006.01)
    B23P 11/00    (2006.01)
    F16B 37/08    (2006.01)

(52) U.S. Cl.
    CPC .................... *F16B 37/0842* (2013.01)
    USPC ....... 29/505; 29/525.03; 29/525.05; 411/276; 411/309; 411/436

(58) Field of Classification Search
    USPC ............... 29/505, 525.01, 525.02, 525.03, 29/525.05, 525.11, 525; 411/276, 307, 411/308, 309, 436, 427, 437
    See application file for complete search history.

(56) References Cited

U.S. PATENT DOCUMENTS

| | | | | |
|---|---|---|---|---|
| 1,830,787 | A * | 11/1931 | Ferry | 411/429 |
| 2,490,594 | A * | 12/1949 | Madden | 411/180 |
| 2,544,304 | A * | 3/1951 | Eckenbeck et al. | 411/180 |
| 2,632,355 | A * | 3/1953 | Becker | 411/427 |
| 2,839,115 | A * | 6/1958 | Forgaard | 411/265 |
| 3,034,611 | A * | 5/1962 | Zenzic | 403/408.1 |
| 3,129,444 | A * | 4/1964 | Kahn | 470/10 |
| 3,326,260 | A * | 6/1967 | Tucker | 411/303 |
| 3,449,799 | A * | 6/1969 | Bien | 411/548 |
| 4,197,030 | A * | 4/1980 | Debaigt | 403/408.1 |
| 4,448,565 | A * | 5/1984 | Peterson | 403/408.1 |
| 4,770,584 | A * | 9/1988 | Vinciguerra | 411/389 |
| 5,445,483 | A * | 8/1995 | Fultz | 411/181 |
| 6,018,828 | A * | 2/2000 | Loschelder | 4/695 |
| 7,877,948 | B2 * | 2/2011 | Davies | 52/506.05 |
| 2001/0026746 | A1 * | 10/2001 | Calandra et al. | 411/436 |
| 2003/0152442 | A1 * | 8/2003 | Curley et al. | 411/427 |
| 2005/0031435 | A1 * | 2/2005 | Curley et al. | 411/427 |
| 2010/0294086 | A1 * | 11/2010 | Gay et al. | 81/121.1 |

* cited by examiner

*Primary Examiner* — David Bryant
*Assistant Examiner* — Christopher M Koehler
(74) *Attorney, Agent, or Firm* — Baker & Hostetler LLP

(57) ABSTRACT

According to aspects of one or more exemplary implementations, disclosed is a flanged ribbed nut, or FRN, having a head above an extended flange formed integral to said head, and a neck integral to and extending from said flange opposite said head, and a threading guide in fluid communication with said head, flange and neck, and having at least two interfering ribs formed therein.

10 Claims, 4 Drawing Sheets

FLANGED RIBBED NUT

RELATED APPLICATION

This application claims the full Paris Convention benefit of and priority to U.S. Provisional Patent Application Ser. No. 61/454,820, filed Mar. 21, 2011, the contents of which are incorporated by reference herein in its entirety, as if fully set forth herein.

BACKGROUND

1. Field

This disclosure relates to a flanged ribbed nut.

2. General Background

A flange nut has a wide flange at one end that acts as an integrated, non-spinning washer. This serves to distribute the pressure of the nut over the part being secured, reducing the chance of damage to the part and making it less likely to loosen as a result of an uneven fastening surface.

The flange may be serrated to provide a locking action. The serrations are angled such that they keep the nut from rotating in the direction that would loosen the nut. Because of the serrations they cannot be used with a washer or on surfaces that cannot be scratched. Sometimes both faces of the nut are serrated, permitting either side to lock.

SUMMARY

Briefly stated, the flanged ribbed nut devices according to implementations of the present disclosure obviate the shortfalls of prior flanged nuts and nut washer or nut collar combinations.

According to aspects of one or more exemplary implementations, disclosed is a flanged ribbed nut with a central channel or threading guide containing two or more of ribs. Ribs are not threads. Ribs are not oriented or intended to be thread like guides. Ribs are a malleable obstructions in a threading guide. In some instances, displaced rib material, also referred to as rib lips extends into the gap area between ribs. In said gap area, lip material contributes to fastening of a threaded fastener into the nut. In some instances, moving malleable rib material to a gap area when accommodating a threaded fastener reduces pressure that would be applied to the threading guide by the introduction of threads via relocating rib material to gaps.

According to aspects of one or more exemplary implementations, disclosed is a flanged ribbed nut with a central threading guide that contains interfering ribs.

According to aspects of one or more exemplary implementations, disclosed is a flanged ribbed nut with a head or top portion above an extended flange formed integral to said head and a neck integral to and extending from said flange opposite said head.

According to aspects of one or more exemplary implementations, disclosed is a flanged ribbed nut with a head or top portion above an extended flange formed integral to said head and a neck integral to and extending from said flange opposite said head and a threading guide in fluid communication with said head, flange and neck having at least two interfering ribs therein.

According to aspects of one or more exemplary implementations, disclosed is a flanged ribbed nut with a head or top portion above an extended flange formed integral to said head and a neck integral to and extending from said flange opposite said head and a threading guide in fluid communication with said head, flange and neck having at least two interfering ribs therein and said flange is stepped to form two or more concentric flanges of different diameters.

According to aspects of one or more exemplary implementations, disclosed is a flanged ribbed nut with a head or top portion above an extended flange formed integral to said head and a neck integral to and extending from said flange opposite said head and a threading guide in fluid communication with said head, flange and neck having at least two interfering ribs therein and an integral bevel is formed between said flange and neck According to aspects of one or more exemplary implementations, disclosed is a flanged ribbed nut with a head or top portion above an extended flange formed integral to said head and a neck integral to and extending from said flange opposite said head and a threading guide in fluid communication with said head, flange and neck having at least two interfering ribs therein and an annular wall extends downwards below said flange and around at least a portion of said neck.

DRAWINGS

The above-mentioned features of the present disclosure will become more apparent with reference to the following description taken in conjunction with the accompanying drawings wherein like reference numerals denote like elements and in which.

Figure 1A:
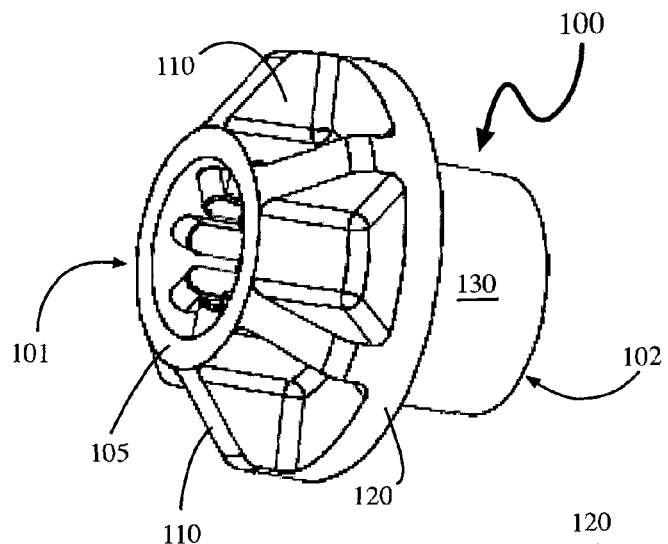
FIG. 1A shows a front perspective view of some aspects of a flanged ribbed nut.

While the specification concludes with claims defining the features of the present disclosure that are regarded as novel, it is believed that the present disclosure's teachings will be better understood from a consideration of the following description in conjunction with the appendices, figures, in which like reference numerals are carried forward. All descriptions and callouts in the Figures are hereby incorporated by this reference as if fully set forth herein.

Further Description

Figure 1B:
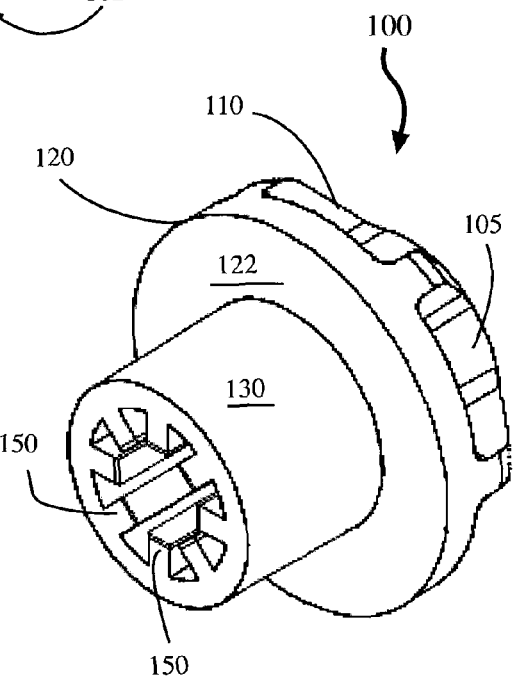
FIG. 1B shows a rear perspective view of some aspects of a flanged ribbed nut.
Figure 1C:
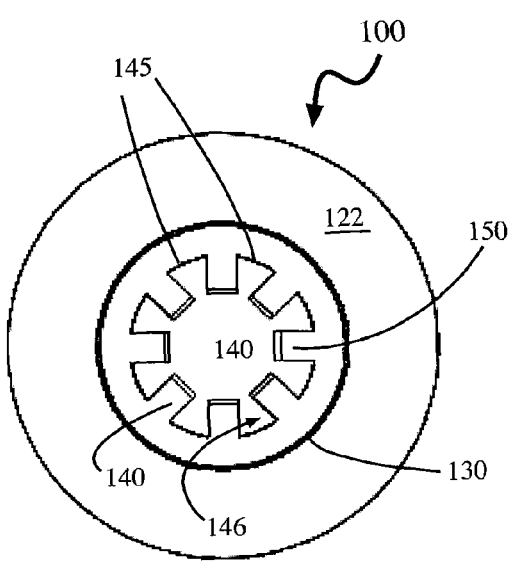
FIG. 1C shows a rear view of a flanged ribbed nut.

According to one or more exemplary implementations, as shown in FIGS. 1A-1C a flanged ribbed nut 100 which may also be referred to as an "FRN." The FRN has a head 105 portion shown with optional extended buttresses 110 forming walls connected to said head and to an extended flange 120, said flange seated at the lower portion 107 of the head, said buttresses seated above said flange and communicating with the side of said head extending above said flange. The proximal side 121 of the flange is closest to the head and the distal side of the flange is furthest from said head. A neck 130 is formed integral with at least said flange and extends from the bottom (distal side) 122 of the flange opposite the head. The FRN is constructed of a plastic material or a composite including plastic. Plastic and other economical equivalents improve cost efficiency of production while providing high tensile strength, resistance to deformation, etc. Effective materials include nylon, PTFE, kevlar, plastics, resins, polymers, imides, fluoropolymers, thermoplastic polymers, thermosetting plastics, and the like, as well as blends or mixtures thereof.

A threading guide 140 is a pathway in communication with the neck, flange and head said threading guide 140 has an annular wall 145 which is ribbed with ribs 150 extending from the annular wall 145 and both in towards the center of the channel and lengthwise from near the proximal end 101 to near the distal end 102 of the channel. The annular wall 145 of the threading guide 140 is interspersed with said ribs 150, said ribs may extend generally longitudinally along all or most of the length. In some instances said ribs may be half ribs extending from either the distal or proximal ends of the channel and terminating before the other end. Such half ribs may also be not aligned wherein a half rib may extend from distal end to middle of the internal channel, and another half rib may extend from proximal end towards middle of the internal channel, but the ribs may be offset wherein while generally parallel along the channel and to each other, they need not be in line and may be spaced to be generally parallel but offset when viewed from up or down said internal channel. Those of ordinary skill in the art will recognize that although the ribs are illustrated as substantially uniform and parallel, they also may be formed non-uniform in girth and size, and need not be parallel and such variations are within the scope of this disclosure. However, for injection molding, substantially parallel ribs with minimal draft may be preferred.

Figure 5:
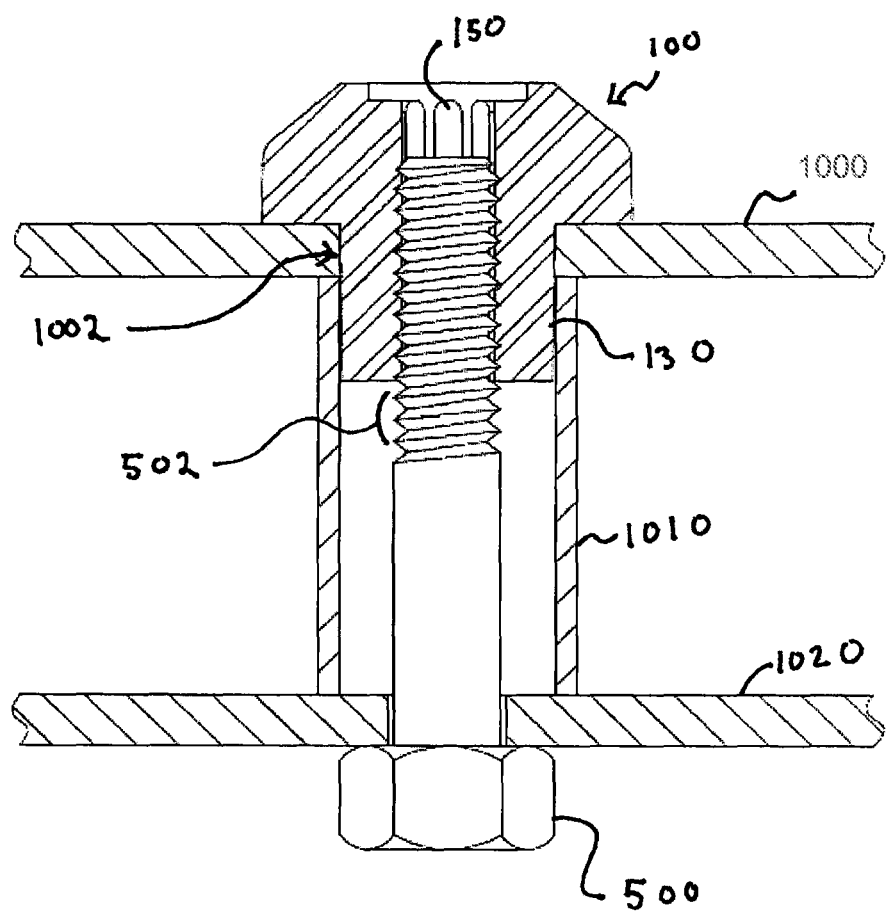
FIG. 5 shows a cut away side view of some aspects of a flanged ribbed nut.
Figure 6:
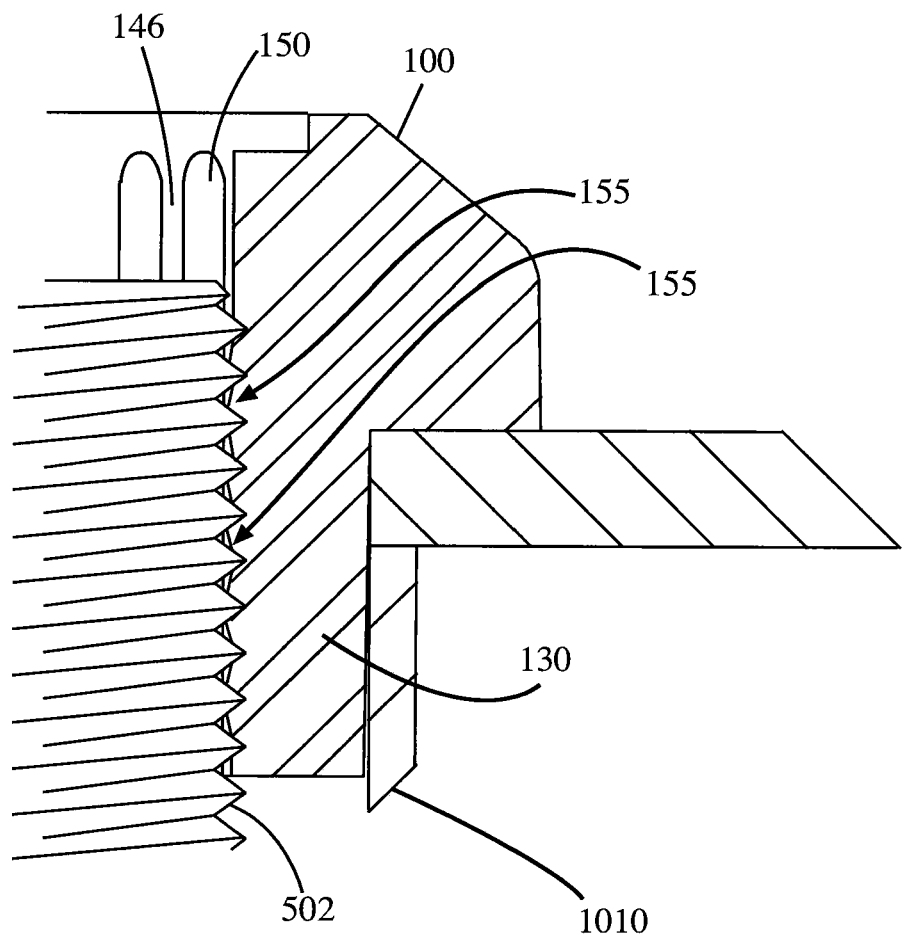
FIG. 6 shows a partial view of FIG. 5.

Referring now to FIG. 5, when a fastener 500 such as a threaded bolt is attached to the nut 100, said ribs 150 deform and fastener threading 502 becomes fixed in such rib material. A first element such as a frame 1000 with a guide hole 1002 therein may be attached to second material 1020. The first material may also be a laminate or combination of two or more materials (not shown). The neck 130 of the nut 100 may be inserted in the guide hole 1002 and a spacer 1010 may be interspersed between. In those instances wherein the neck is beveled, stepped or an annular wall, those neck alterations may be fitted in said guide hole. The varied neck arrangements may also be useful in holding, centering and affixing multiple materials.

Figure 2:
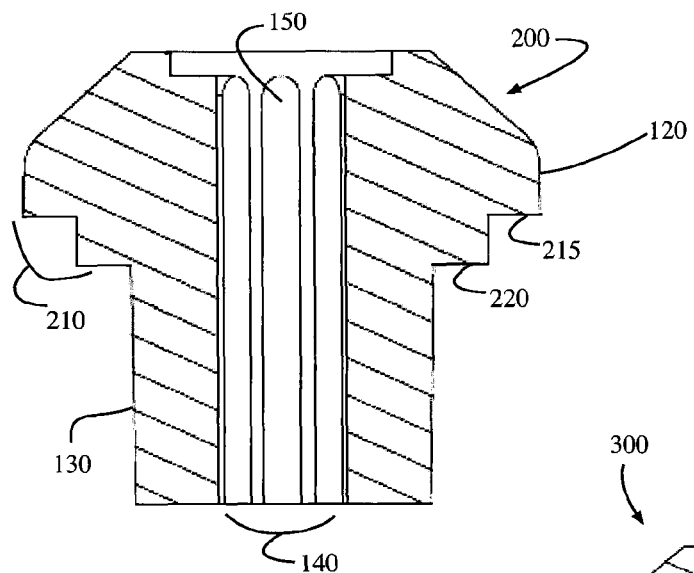
FIG. 2 shows a cut away side view of some aspects of a flanged ribbed nut.

According to one or more exemplary implementations, as shown in FIG. 2, is a stepped flanged ribbed nut 200. Said flange has concentric stepped levels 210 with a first level 215 extending below the head 105 and a smaller diameter second level 220 extended below the first level and at the top of the neck 130. Ribs 150 traverse the threading guide 140. Said concentric levels may be used to connect two or more materials with guide holes corresponding to each of said first level 215 and smaller second level 220.

Figure 3:
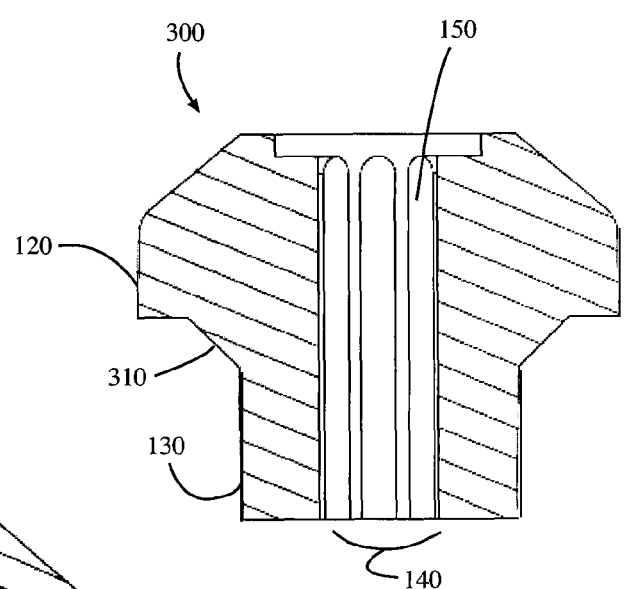
FIG. 3 shows a cut away side view of some aspects of a flanged ribbed nut.

According to one or more exemplary implementations, as shown in FIG. 3, a beveled flanged ribbed nut 300 is illustrated. A bevel interposed between the flange 120 and neck 130. An angled bevel 310 is adaptable to many sizes of holes, different spacers, spring or other parts that the next-bevel portion of the nut 200 may be used in conjunction with. Ribs 150 traverse the threading guide 140.

Figure 4:
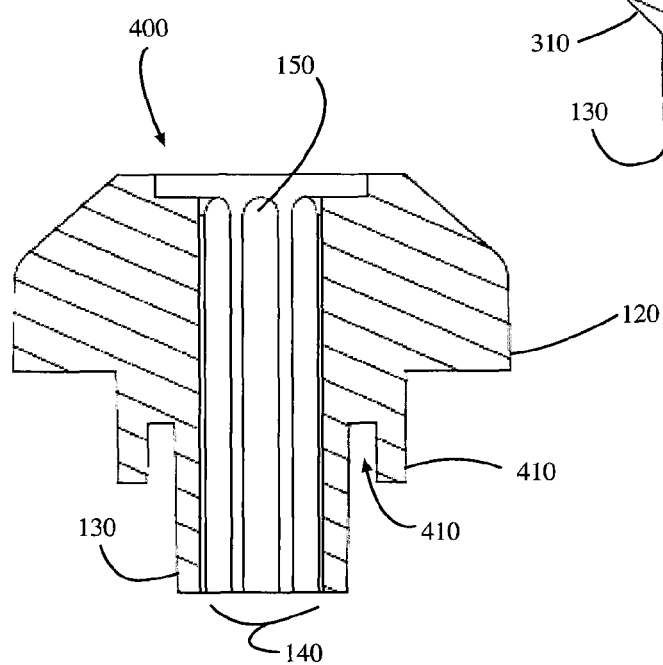
FIG. 4 shows a cut away side view of some aspects of a flanged ribbed nut.

According to one or more exemplary implementations, as shown in FIG. 4, an annular walled flanged ribbed nut 400 with a annular wall 410 extended from the bottom 122 of the flange 120 between the flange 120 and neck 130. The annular wall creates a channel 41 between the neck 130 and annular wall 410. The channel provides a location point, a guide and/or a catch. Those of ordinary skill in the art will recognize that within the scope of this disclosure are variations in the annular wall which may include but are not limited to, shape and size, whether the wall is solid or has cut out sections and whether the wall thickness and or length is homogenous or varied. Ribs 150 traverse the threading guide 140.

According to one or more exemplary implementations, as shown in FIGS. 2-6, the ribs are shown deforming due to the passage of the fastener threading 502 into the threading guide 140. The ribs 150 are preferably formed of a material which is softer than the fastener threading 502 and thereby malleable when pressed against by said fastener threading 502 within said threading guide 140. The deformation of the ribs produces one or more rib lips 155 which roughly correspond to a portion of the fastener threading which displaced the softer rib material during threading. At least a portion of the displaced rib material extends from the rib into the gap 146 between the rib 150 and the annular wall 140 from which the rib extends. In some instances said displacement provides a method of relocating rib material away from the threading without substantially increasing the pressure against the annular wall 140.

While the method and agent have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans.

In this regard it should be understood that for practical reasons and so as to avoid adding potentially hundreds of claims, the applicant has presented claims with initial dependencies only.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A fastening method, the method comprising:
   threading a ribbed nut with a threading guide containing ribs separated by gaps onto a threaded fastener, said threaded fastener being constructed of a material which is harder than said ribbed nut;
   forming lips of displaced rib material at least partially extending into said gaps during the threading of said threaded fastener onto said ribbed nut; and
   inserting a beveled area into a guide hole, wherein the beveled area is above a neck of the ribbed nut and extends at least one third of a radial length of a flange of the ribbed nut;
   wherein said ribbed nut has at least two buttresses connecting a head of the nut to the flange such that the flange will withstand a greater load than a solid hexagonal nut of the same material.

2. The fastening method of claim 1 wherein the threading guide is a generally circular annular wall from which said ribs extend and traverse longitudinally.

3. The fastening method of claim 1, the method further comprising affixing one or more materials via guide holes between said threaded fastener and said ribbed nut.

4. The fastening method of claim 1, further comprising a plurality of buttresses located in an array connecting the head of the nut to the flange;
   whereby the flange will withstand a greater load than a solid hexagonal nut of the same material.

5. The fastening method of claim 1, wherein the threading guide extends beyond both sides of the flange.

6. A method of fastening, the method comprising:
   placing a guide hole in a first material;
   placing a neck of a plastic flanged nut with a threading guide therein in said guide hole, the flanged nut having malleable ribs running axially from an annular wall of the flanged nut through the neck;
   threading a threaded fastener into the threading guide, said threaded fastener being constructed of a material which is harder than said ribs; and
   deforming the malleable ribs to at least partially fill in around threads of the threaded fastener with displaced rib material at least partially extending into gap spacing during the threading of said threaded fastener into the threading guide, wherein said flanged nut has at least two buttresses connecting a head of the nut to a flange of the flanged nut.

7. The method of claim 6, wherein said flanged nut has a stepped flange which fits into said guide holes.

8. The method of claim 6, wherein the threading guide is a generally circular annular wall from which said ribs extend and traverse.

9. The fastening method of claim 6, further comprising:
   a plurality of buttresses located in an array connecting the head of the nut to the flange;
   whereby the flange will withstand a greater load than a solid hexagonal nut of the same material.

10. The fastening method of claim 6, wherein the threading guide extends beyond both sides of the flange.

* * * * *